United States Patent [19]

Kitagawa et al.

[11] Patent Number: 4,693,608
[45] Date of Patent: Sep. 15, 1987

[54] METHOD AND APPARATUS FOR DETERMINING POSITION OF POINTS ON ARTICLE

[75] Inventors: Katsuichi Kitagawa, Moriyama; Kouichi Tamura, Kudamatsu, both of Japan

[73] Assignee: Toray Industries, Inc., Tokyo, Japan

[21] Appl. No.: 792,315

[22] Filed: Oct. 28, 1985

[30] Foreign Application Priority Data

Oct. 29, 1984 [JP] Japan ................................ 59-225793

[51] Int. Cl.$^4$ .............................................. G05B 1/00
[52] U.S. Cl. .................................... 356/394; 356/237; 356/378
[58] Field of Search ...................... 356/237, 394, 378; 382/8, 44

[56] References Cited

U.S. PATENT DOCUMENTS 3,806,252 4/1974 Harris et al. ........................ 356/378
3,873,211 3/1975 Watson ................................ 356/378

OTHER PUBLICATIONS

Tsujiyama et al, "An Automated Mask Defect Inspection System", *Review of the Electrical Communication Laboratories*, vol. 30, No. 6 (1982) pp. 1076-1085.
West et al, "Computer-Controlled Optical Testing of High Density Printed Circuit Boards", *IBM Journal of Research and Development*, vol. 27, No. 1 (Jan. 1983) pp. 50-58.

*Primary Examiner*—R. A. Rosenberger
*Attorney, Agent, or Firm*—Birch, Stewart, Kolasch & Birch

[57] ABSTRACT

A method for determining positions of points on a surface of an article including the steps of: detecting apparent positional information of the points from an image of the arrangement of the points; detecting a relative difference between the apparent positional information and predetermined positional information according to design data of the arrangement of the points; and modifying the apparent positional information by the relative difference, which modified information is transmitted to a subsequent system for positioning the point in place. By this, it is possible to inspect a plurality of apertures arranged with a predetermined relationship to each other, such as holes on a nozzle plate of a spinneret, in which apertures are sequentially positioned under a microscope according to positional signals generated based on the positional information obtained.

4 Claims, 9 Drawing Figures

METHOD AND APPARATUS FOR DETERMINING POSITION OF POINTS ON ARTICLE

BACKGROUND OF THE INVENTION

1. Field of the Invention

The present invention relates to a method and an apparatus for determining the position of points arranged on a surface of an article so as to enable accurate positioning of an article in an inspection process or the like.

In the synthetic fiber industry, for example, a spinneret having a nozzle plate with a plurality of holes is utilized for spinning a filament from a liquid-state material. It is important to maintain the dimensions of the nozzle holes to within a certain range so as to enable a stable spinning operation and uniform fiber quality. Therefore, the inspection of holes is a daily job in the spinning factory. Spinnerets are periodically examined and, if the nozzle holes have been damaged, are replaced.

The present invention is suitably utilized in the prior stage of such an inspection for determining the position of each hole on the nozzle plate so that it is brought into alignment with the axis of an inspecting instrument. However, application is not limited to this purpose. It may be utilized for assembly of electronic components on a circuit board, in which leads of the components are automatically inserted into apertures in the circuit board.

2. Description of the Related Art

Usually, inspection of an aperture in an article surface, such as a nozzle hole of a spinneret, is carried out by means of a microscope. In this inspection, each aperture of the article must be sequentially brought in the field of view of the microscope. In an automated inspecting system, the overall image of the article to be inspected is taken by a visual sensor, such as a TV camera, prior to examination of each aperture, for obtaining positional information on the apertures and generating signals for sequentially positioning the apertures to an inspecting point. The image, however, often tends to be distorted due to the tilt of the sensor and/or the article and, further, signal distortion inherent to the instrument, whereby the inaccurate information is provided from the sensor, which, in turn, prevents correct positioning of the aperture within the field of view of the microscope. Moreover, even if the image is not so distorted, another problem occurs when an article has a circular profile. That is, in such a case, it is difficult to position it in a definite angular disposition relative to a center thereof without provision of special positioning means. This means arrangement of the apertures is indefinite relative to the visual sensor at every article.

SUMMARY OF THE INVENTION

Thus, it is a primary object of the present invention to eliminate the above drawbacks of the prior art.

It is a second object of the present invention to provide a system for obtaining accurate positional information on a plurality of points arranged on a surface of an article.

It is a third object of the present invention to provide a processing system of an article combined with the abovesaid positional information system, such as for inspection or assembly thereof.

The above objects of the present invention are achievable by a method for determining positions of points arranged on a surface of an article, comprising the steps of: detecting apparent positional information of the points from an image of the arrangement of the points: detecting a relative difference between the apparent positional information and predetermined positional information according to design data of the arrangement of the points; and modifying the apparent positional information by the relative difference, which modified positional information is transmitted to a subsequent system for positioning the point in place.

One example of the subsequent system may be a system for inspection of apertures provided on the surface of an article comprising the steps of: receiving a beam reflected from one surface of the article on which the aperture is opened, the beam including information of an outer edge of a periphery of the aperture; receiving another beam projected from the opposite side of the article through the aperture, the beam including information of a cross-section of the aperture; and obtaining a deformation value of the edge by comparing the received information regarding the aperture.

One of the most preferable embodiments of the inspection system according to the present invention is for inspection of a hole of a nozzle plate of a spinneret for spinning synthetic fiber, which comprises means for obtaining an image of the arrangement of the apertures, including a first lamp for projecting a beam through the apertures and a first TV camera for receiving the beam from the first lamp, the image including apparent positional information of arrangement of the apertures; means for inspecting an aperture comprising second and third lamps and a microscope connected to a second TV camera, in which the second lamp projects a beam from one side of the article onto a surface thereof and the third lamp projects another beam from the other side of the article through the apertures, respectively, and the microscope alternately receives the beam from the second lamp reflected by the article surface, including information of an outer edge of a periphery of the aperture, and the other beam from the third lamp transmitted through the aperture, including information of a cross-section of the aperture, the information being sequentially transmitted to the second TV camera; a table disposed underside from the above means and movable in three-dimensional directions by means of a drive, while holding the article substantially horizontal; and a computer, at first, for receiving the apparent positional information of the aperture from the first TV camera, modifying the apparent positional information of the aperture by comparing the information with a predetermined arrangement of the respective apertures preset therein, and generating a series of signals to the drive for the table so that each aperture is sequentially aligned with the axis of the microscope for inspection and, second, for receiving the information of the outer edge of the aperture and of the cross-section of the aperture from the second TV camera and obtaining deformation value of an outer edge of the periphery of the aperture.

BRIEF DESCRIPTION OF THE DRAWINGS

These and other advantages and objects of the present invention will be apparent from the following description with reference to the attached drawings illustrating the preferred embodiments of the present invention, wherein.

DESCRIPTION OF THE PREFERRED EMBODIMENTS

Figure 1:
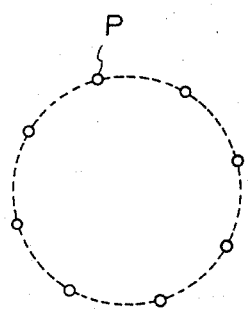
FIG. 1 illustrates an arrangement of apertures on the surface of an inspected nozzle plate.
Figure 2:
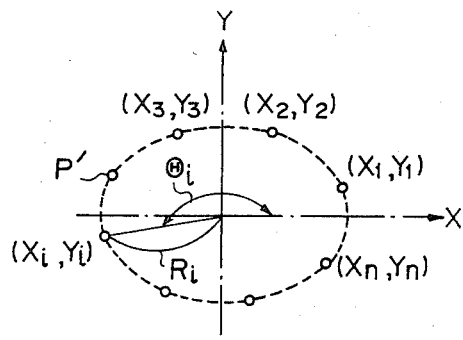
FIG. 2 illustrates one example of distorted images of the arrangement of apertures shown in FIG. 1 obtained by a visual sensor utilized in the inspecting system.

Prior to the description of the embodiment of the present invention, the principle of the present invention will be explained with reference to FIGS. 1 and 2. When a plurality of points provided on the surface of an article are inspected, it is necessary that the each point be sequentially aligned with an axis of an inspection tool, such as a microscope. In automated inspection, this alignment is carried out by having a table holding the article to be inspected moved in accordance with a signal based on positional information of the points obtained by a visual sensor, such as a TV camera. However, the image of the points tends to deform due to the tilt of the table and/or signal distortion inherent to the sensor. That is, for example, even if the points are arranged on a circle as shown in FIG. 1, the image is flattened to an oval as shown in FIG. 2. The alignment operation of a point with the sensor may fail due to this erroneous positional information. In this sense, the positional information from the image is referred to as "apparent positional information". According to the present invention, the true positional information of the points is obtained by correcting the apparent positional information by predetermined design data of the arrangement of the points. Thus, the present invention is only applicable to an article on which a plurality of apertures are arranged with a predetermined known relationship.

Figure 3:
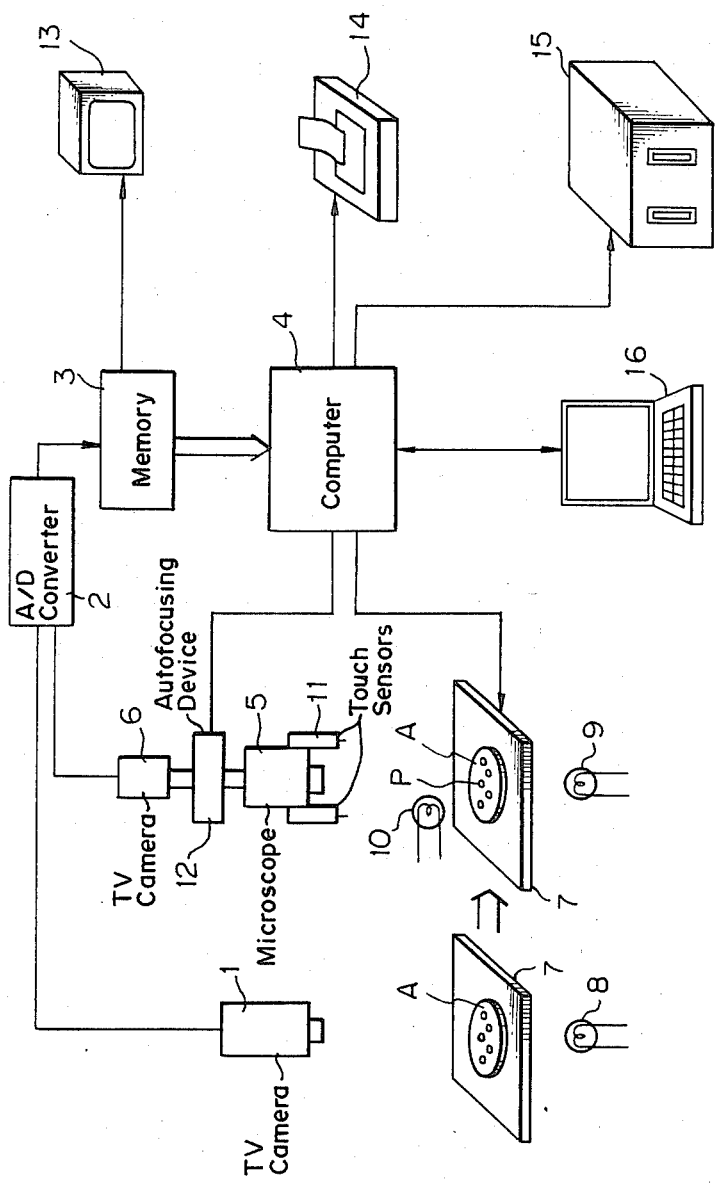
FIG. 3 is a schematic perspective view of a system for inspecting a hole of a nozzle plate of a spinneret as one embodiment of the present invention.

In FIG. 3, a system for automatically inspecting a nozzle plate of a spinneret, to which the present invention applies is schematically illustrated. The system comprises substantially two subsystems; a first subsystem for recognizing position of apertures P arranged on the surface of a nozzle plate A to be inspected and a second subsystem for inspecting each aperture. The former subsystem includes a TV camera 1 utilized as a visual sensor for obtaining apparent positional information of the apertures P, an analog-to-digital (A/D) converter 2 for converting an analog signal of the apparent positional information from the TV camera 1 to a digital signal, a memory 3 for storing the digital signal and the predetermined design data of the position of the apertures therein, and a computer 4 for accessing to the memory 3 and obtaining the modified positional information of the apertures P. On the other hand, the latter subsystem comprises a microscope 5, a TV camera 6, the A/D converter 2, the memory 3, and the computer 4. In this embodiment, it is apparent that the A/D converter 2, the memory 3, and the computer 4 are common to both subsystems.

The nozzle plate A is placed substantially horizontal on an X-Y-Z table 7 movable in three dimensional directions and can selectively occupy two positions: a first one beneath the TV camera 1 for detection of the arrangement of the aperture P and a second one beneath the microscope 5 for inspection of the apertures, in accordance with the movement of the table 7. In this connection, a through opening is provided on a part of the table 7 where the nozzle plate A is placed for a path of a light projected from the underside of the table 7, as stated later.

The apertures P are bored on the surface of the nozzle plate A with an accurate positional relationship to each other based on predetermined design data, as stated before.

First, a method for obtaining positional information of the apertures by means of the first subsystem will be explained. The plate A is positioned beneath the TV camera 1 while a light beam is projected from a lamp 8 disposed underside from the table 7. The beam passing through the apertures P is received by the TV camera 1 and converted to an analog signal of an image of the apertures. The image signal is converted to a digital one through the A/D converter 2 and stored in the memory 3 as apparent positional information of the apertures P for controlling the disposition of the plate A in the subsequent subsystem, so that the apertures P are sequentially aligned with the axis of the microscope 5. This positional information stored in the memory 3, however, tends to be deformed, as stated before. For example, even if the apertures P are arranged along a periphery of a circle as shown in FIG. 1, the apparent position thereof obtained by the TV camera is deformed to be oval form as shown in FIG. 2. Therefore, the apparent positional information must be modified by the following manner by the computer 4:

(1) obtaining rectangular coordinates of the position (apparent position) $(X_i, Y_i)$ of each aperture P from the detected data, wherein i stands for an integer selected from 1 to n, n being the number of the apertures P;

(2) obtaining rectangular coordinates of a geometrical center of gravity $(X_0, Y_0)$ of all the apparent positions $(X_i, Y_i)$ in accordance with the following two equations (a) and (b):

$$X_0 = 1/n \times \sum_{i=1}^{n} X_i \tag{a}$$

$$Y_0 = 1/n \times \sum_{i=1}^{n} Y_i \tag{b}$$

wherein this geometrical center of gravity $(X_0, Y_0)$ is a value representing a distance between a position of the predetermined design center (origin) and the center of the existing circle;

(3) converting the representation of the rectangular coordinates of the apparent position of the apertures $(X_i, Y_i)$ to a polar form $(R_i, \Theta_i)$ having an origin at the center of gravity $(X_0, Y_0)$ in accordance with the following two equations (c) and (d):

$$R_i = \sqrt{(X_i - X_0)^2 + (Y_i - Y_0)^2} \tag{c}$$

$$\theta_i = \tan^{-1}\{(Y_i - Y_0)/(X_i - X_0)\}; \tag{d}$$

(4) obtaining an average value $\bar{\Theta}$ of angular 3 difference of the position of each aperture $(R_i, \Theta_i)$ from design data thereof $(r_0, \theta_i)$ preliminarily stored in the memory 3 in accordance with the following equation (e):

$$\bar{\theta} = \sum_{i=1}^{n} (\Theta_i - \theta_i)/n \quad (e)$$

wherein the abovesaid polar coordinates $(r_0, \theta_i)$ have an origin thereof at a center of a circle on which the respective apertures are to be arranged;

(5) correcting the apparent position of the apertures P in accordance with the following two equations:

$$X'_i = r_0 \cdot \cos(\theta_i + \bar{\Theta}) + X_0 \quad (f)$$

$$Y'_i = r_0 \cdot \sin(\theta_i + \bar{\Theta}) + Y_0 \quad (g)$$

The modified data $X'_i$ and $Y'_i$ of the positional i information of the apertures P are sequentially transmitted to a drive (not shown) of the table 7 as the inspecting operation of one aperture is over, and the table 7 is moved to position the nozzle plate A so that the next aperture to be inspected is aligned with the axis of the microscope 5.

In conclusion, the object of the abovesaid procedures is detection of the discrepancy of the position of the geometrical center of gravity of the apparent position of the apertures from that of the design data and detection of the deviation angle of the respective apertures from the design data. The coordinates of the apparent positional information of the apertures are corrected by the detected discrepancy and the deviation angle.

Figure 4:
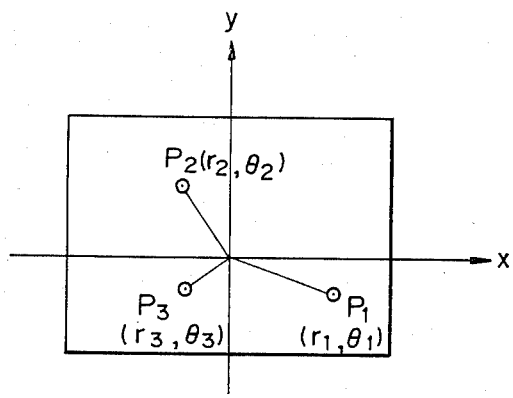
FIGS. 4 and 5 are similar views as FIGS. 1 and 2, illustrating another arrangement of apertures and a distorted image thereof, respectively.
Figure 5:
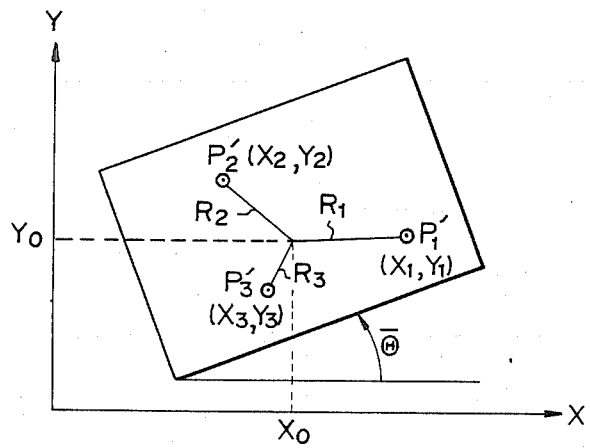

Though the apertures P are arranged along the periphery of a circle with an equal pitch in the above embodiment, the present invention is also applicable to other arrangements, provided the positional design data of the apertures is known. Even in such a case, the procedures (1) to (5) are effective, though a little modification is required. That is, prior to calculation of equation (e) of procedure (4), the apparent position of each aperture must match with the respective design data. For example, if the respective $r_i$, or $R_i$ are sufficiently different from each other, as shown in FIGS. 4 and 5, the correspondence between the two groups can be achieved by arranging the design data of the aperture $(r_i, \theta_i)$ and the apparent position of the aperture $(R_i, \Theta_i)$ by size of $r_i$ or $R_i$, respectively. If all the values of $r_i$ or $R_i$ are too close to each other to be distinct, the values of $\theta_i$ and $\Theta_i$ are utilized in place of the values of $R_i$ and $r_i$, respectively. Next, from the arrays of the data arranged by size of $\Theta_i$ and $\theta_i$, a difference $\Theta_{i+1} - \Theta_i$ and $\theta_{i+1} - \theta_i$ between the adjacent data is calculated. The correspondence is achieved by selecting two data imparting a peculiar value of difference, such as the maximum or minimum, from the respective groups. It will be apparent that the correspondence between all the data of the two groups can be sequentially obtained by using the abovesaid pair of data as a reference.

Next, use of the subsystem for inspecting each aperture is explained in more detail.

The object of this inspection is to determine nozzle plates A having worn holes so that such plates can be replaced. Wear of the hole mainly occurs in the outer edge portion of the aperture P. Therefore, the inspection aims to detect the degree of deformation of the outer edge of a periphery of the aperture.

Figure 6:
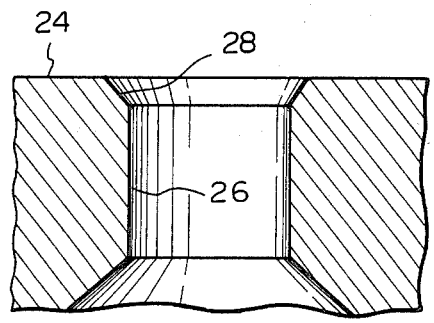
FIG. 6 is a side sectional partial view of a nozzle plate to be inspected by a system of the present invention.
Figure 7:
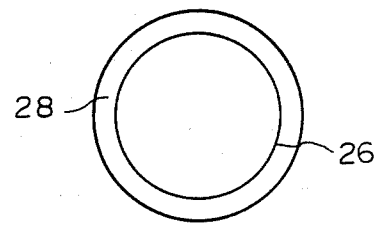
FIG. 7 is a plan view of FIG. 6.

An enlarged view of a hole, in other words, the aperture P, is shown in FIGS. 6 and 7. The outer edge of a periphery of the aperture P is chamferred and constitutes a border portion 28 of a truncated conical shape, while an inner wall 26 is of a strict cylindrical shape. Alternatively, the inner wall 26 may perpendicularly intersect an outer surface 24 of the aperture P, in such a case the border portion 28 being a circle. In any case, the shape of the border portion 28 is very important for the spinning operation of synthetic fiber. If the deformation of the border portion 28 exceeds a certain amount, the quality of the resultant fiber is degraded.

Figure 8:
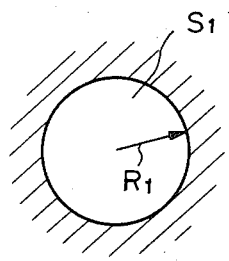
FIGS. 8 and 9 are two kinds of images of a hole obtained by the system of FIG. 3.

The principle of the inspection according to the present invention will be described below. The aperture P to be inspected is disposed on the table 7, with the outer surface 24 upside, beneath the microscope 5 while being aligned with the axis of the microscope 5 in accordance with a command from the computer 4, as stated before. At first, a light beam is projected onto the spinneret plate A from a second lamp 9 disposed beneath the table 7. The beam passes upward through the aperture P to be inspected and is received by the microscope 5. This beam forms a lighted image of the cross-section of the aperture P bordered by the inner wall 26, as illustrated in FIG. 8. The image is input to the TV camera 6 and converted to an analog signal including information of the cross-section of the aperture P, which signal is, in turn, converted to a digital signal by the A/D converter 2 and stored as a first data in the memory 3. By the computer 4, a first value corresponding to an area $S_1$ of the lighted cross-section is obtained from the first data. Next, a derived value corresponding to a radius $R_1$ is obtained according to the equation $$R_1 = \sqrt{S_1/\pi} .$$

Figure 9:
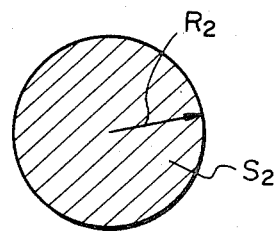

Thereafter, the lamp 9 is turned off. In place, a lamp 10 disposed above the table 7 projects a light beam onto the plate A, which beam is reflected from the upper surface 24 of the plate A and is received by the microscope 5. As shown in FIG. 9, the beam forms a dark image of the aperture P including information of the border portion 28 because the aperture P itself and the chamferred border portion 28 reflect substantially no beam receivable in the microscope 5. The image is stored as second data in the memory 3 in a manner similar to the first data. By the computer 4, a second value $S_2$ corresponding to an area of the dark image and, next, a derived value $R_2$ corresponding to a radius thereof are obtained from the second data in a manner similar to the above case, wherein $R_2$ is derived from the equation $$R_2 = \sqrt{S_2/\pi} .$$

Then, a difference W between $R_1$ and $R_2$ is calculated in the computer 4 according the equation $$W = R_2 - R_1$$

The value W represents an average width of the border portion 28. Excess of this value W over the design data means wear of the aperture. Therefore, the value may be referred to a "deformation value". If this value is out of the predetermined allowance, an alarm signal is generated from the computer 4 so that the plate A may be replaced for maintaining fiber quality.

In FIG. 3, reference numeral 11 designates a touch sensor for preventing the microscope 5 from contact with the table 7 when focusing; 12 an autofocusing device for the microscope 5; 13 a monitoring display for the image of the aperture to be inspected; 14 a printer for outputting the abovesaid various data from the computer; 15 a disc drive for storing the data from the computer; and 16 a key board with a display for inputting various data to the computer.

EXAMPLE

Automatic inspection of various nozzle plates was carried out by means of the system illustrated in FIG. 3. The nozzle plates had a diameter of 110 mm and were provided with a plurality of holes arranged on a periphery of concentric circles, the number of which is in a range of from 24 to 72 and a size of which is within a range of from 200 $\mu$m to 400 $\mu$m. The manufacturing accuracy of the hole was within $\pm 20$ $\mu$m relative to the design data. The field of view of the TV camera for obtaining the image of the arrangement of the holes was 150 mm $\times$ 150 mm. According to this system, the apparent position detected by the image had a maximum distortion of 3 mm relative to the design data. After modification, the positional information of the hole was corrected to have an error of less than 0.5 mm, whereby the hole to be inspected could be brought into the field of view of the microscope ranged in 0.8 mm $\times$ 0.8 mm.

We claim:

1. A method for locating and inspecting apertures on the surface of an article in an aperture inspecting system comprising the steps of:

detecting apparent positional information of said apertures from an image of the arrangement of said apertures;

detecting a relative difference between said apparent positional information and predetermined positional information according to design data of the arrangement of said apertures;

modifying said apparent positional information by said relative difference, which modified information is transmitted to a subsequent system for positioning said aperture in place for inspecting;

receiving a beam reflected from one surface of said article on which said aperture is opened, said beam including information of an outer edge of a periphery of said aperture;

receiving another beam projected from the opposite side of said article through said aperture, said beam including information of a cross-section of said aperture; and obtaining a deformation value of said edge by comparing the received information regarding said aperture.

2. A method defined by claim 1, wherein said aperture is a hole of a nozzle plate of a spinneret.

3. An apparatus for inspecting apertures arranged on the surface of an article with a predetermined relationship between each other, comprising:

means for obtaining an image of arrangement of said apertures, comprising a first lamp for projecting a beam through said apertures and a first TV camera for receiving the beam from said first lamp, said image including apparent positional information of the arrangement of said aperture;

means for inspecting an aperture comprising second and third lamps and a microscope connected to a second TV camera, in which said second lamp projects a beam from one side of the article onto a surface thereof, said third lamp projects another beam from the other side of the article through said aperture, and said microscope alternately receives the beam from said second lamp reflected by the article surface, including information of an outer edge of a periphery of said aperture, and the other beam from said third lamp transmitted through said aperture, including information of a cross-section of said aperture, said information being sequentially transmitted to said second TV camera;

a table disposed underside from said means and movable in three-dimensional directions by means of a drive, while holding said article substantially horizontal; and a computer, first, for receiving said apparent positional information of said apertures from said first TV camera, modifying the apparent position of said aperture by comparing said information with a predetermined arrangement of the respective apertures preset therein, and generating a series of signals to said drive for said table so that each aperture is sequentially aligned with the axis of said microscope for inspection and, second, for receiving said information of the outer edge of said aperture and of the cross-section of said aperture from said second TV camera and obtaining a deformation value of an outer edge of the periphery of said aperture.

4. An apparatus defined by claim 3, wherein said aperture is a hole of a nozzle plate of a spinneret.

* * * * *